(12) United States Patent
Kim et al.

(10) Patent No.: US 10,205,578 B2
(45) Date of Patent: Feb. 12, 2019

(54) ACKNOWLEDGEMENT PROCEDURE IN WLAN

(71) Applicant: LG ELECTRONICS INC., Seoul (KR)

(72) Inventors: Jeongki Kim, Seoul (KR); Kiseon Ryu, Seoul (KR); Hangyu Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/695,498

(22) Filed: Sep. 5, 2017

(65) Prior Publication Data

US 2018/0069678 A1 Mar. 8, 2018

Related U.S. Application Data

(60) Provisional application No. 62/383,496, filed on Sep. 5, 2016, provisional application No. 62/383,500, filed on Sep. 5, 2016.

(51) Int. Cl.
| | |
|---|---|
| *H04L 5/00* | (2006.01) |
| *H04W 72/12* | (2009.01) |
| *H04L 1/18* | (2006.01) |
| *H04W 84/12* | (2009.01) |
| *H04L 29/08* | (2006.01) |
| *H04W 92/18* | (2009.01) |
| *H04L 1/16* | (2006.01) |

(52) U.S. Cl.
CPC .......... *H04L 5/0055* (2013.01); *H04L 1/1864* (2013.01); *H04W 72/1284* (2013.01); *H04L 1/1657* (2013.01); *H04L 1/1854* (2013.01); *H04L 69/324* (2013.01); *H04W 84/12* (2013.01); *H04W 92/18* (2013.01)

(58) Field of Classification Search
CPC ... H04L 1/1854; H04L 1/1664; H04L 5/0055; H04L 1/1671; H04L 2025/03426; H04W 84/12; H04W 72/042; H04W 24/08; H04W 28/0268; H04W 72/0413; H04W 72/0446; H04W 72/0453; H04B 7/0452
See application file for complete search history.

(56) References Cited

U.S. PATENT DOCUMENTS

| | | | | |
|---|---|---|---|---|
| 7,852,791 B2 * | 12/2010 | Nakajima | ............. | H04L 1/1614 370/282 |
| 8,842,657 B2 * | 9/2014 | Walton | ................... | H04L 12/66 370/348 |
| 9,036,478 B2 * | 5/2015 | Torab Jahromi | ...... | H04W 74/04 370/229 |
| 9,345,040 B2 * | 5/2016 | Lu | ......................... | H04W 72/12 |

(Continued)

*Primary Examiner* — Matthew C Sams
(74) *Attorney, Agent, or Firm* — Dentons US LLP

(57) ABSTRACT

A method and apparatus for a first station (STA) to transmit an acknowledgement (ACK) signal to a second STA in a wireless local area network (WLAN) are disclosed. For this end, the first STA receive a first type frame aggregated with a second type frame from the second STA, wherein the first type frame does not include a quality of service (QoS) control field while the second type frame includes the QoS control field. Then, the first STA transmits an ACK signal for the first type frame to the second STA based on an ACK policy of the QoS control field of the second type frame.

14 Claims, 10 Drawing Sheets

(56) References Cited

U.S. PATENT DOCUMENTS

| | | | | |
|---|---|---|---|---|
| 2006/0248429 | A1* | 11/2006 | Grandhi | H04L 1/1664 |
| | | | | 714/749 |
| 2008/0130538 | A1* | 6/2008 | Raissinia | H04L 1/1685 |
| | | | | 370/310 |
| 2011/0261742 | A1* | 10/2011 | Wentink | H04L 1/1854 |
| | | | | 370/312 |
| 2014/0233478 | A1* | 8/2014 | Wentink | H04L 5/0055 |
| | | | | 370/329 |
| 2016/0302229 | A1* | 10/2016 | Hedayat | H04B 7/0452 |
| 2016/0330007 | A1* | 11/2016 | Cherian | H04L 5/0055 |
| 2017/0150493 | A1* | 5/2017 | Seok | H04B 7/0452 |
| 2017/0359151 | A1* | 12/2017 | Huang | H04L 1/188 |
| 2018/0019792 | A1* | 1/2018 | Yang | H04W 74/0816 |
| 2018/0242355 | A1* | 8/2018 | Lou | H04W 72/121 |

* cited by examiner

FIG. 6

| Length | Cascade Indication | CS Required | HE-SIG-A Info | CP and LTF Type | Trigger Type | Trigger-dependent Common Info |
|---|---|---|---|---|---|---|
| Bits: 12 | 1 | 1 | TBD | TBD | TBD | variable |

FIG. 7

| User Identifier | RU Allocation | Coding Type | MCS | DCM | SS Allocation | Trigger dependent Per User Info |
|---|---|---|---|---|---|---|
| Bits: 12 | TBD | TBD | TBD | TBD | TBD | variable |

ACKNOWLEDGEMENT PROCEDURE IN WLAN

CROSS REFERENCE

This application claims the benefit of U.S. Provisional Patent Application Nos. 62/383,496, and 62/383,500, both of them filed on Sep. 5, 2016, which are hereby incorporated by reference as if fully set forth herein.

BACKGROUND OF THE INVENTION

Field of the Invention

The present invention relates to improved acknowledgement procedures in a wireless local area network (WLAN). More specifically, the present invention provides improved methods for acknowledgement procedure for the frame without quality of service (QoS) control field, and provides mechanism for requesting Multi-STA ACK frame by a BAR (Block Ack Request) frame.

Discussion of the Related Art

Standards for WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

The above-described WLAN standards have evolved into IEEE 802.11ac that uses a bandwidth of up to 160 MHz and supports a transmission rate of up to 1 Gbits/s for 8 spatial streams and IEEE 802.11ax standards are under discussion.

The station (STA) capable of supporting IEEE 802.11n is officially called as HT (High Throughput) STA. The STA capable of supporting IEEE 802.11ac is officially called as VHT (Very High Throughput) STA. And, the STA capable of supporting IEEE 802.11ax is officially called as HE (High Efficiency) STA.

In the HE system, there are needs for uplink multi-user (UL MU) transmission for various purposes. For example, a trigger frame is introduced to solicit UL MU transmission from multiple STAs. UL MU transmission based on the trigger frame can be based on OFDMA (Orthogonal Frequency Domain Multiple Access) scheme.

For the UL MU transmission, there are various acknowledgement procedures defined for various situations. However, there are some cases need to be clarified, such as, Ack policy definition for the management frame, and the mechanism to solicit adequate type of Ack frame.

SUMMARY OF THE INVENTION

To achieve these objects and other advantages and in accordance with the purpose of the invention, as embodied and broadly described herein, a method for a method for a first station (STA) to transmit an acknowledgement (ACK) signal to a second STA in a wireless local area network (WLAN), the method comprising: receiving a first type frame, not including a quality of service (QoS) control field, from the second STA; transmitting an ACK signal for the first type frame to the second STA based on an ACK policy of a QoS control field of a second type frame, when the first type frame had been received as aggregated with the second type frame including the QoS control field; and transmitting the ACK signal for the first type frame to the second STA through resources allocated by a third type frame, when the first type frame had been received with the third type frame including resource allocation information, wherein the first STA does not transmit the ACK signal for the first type frame, when the first frame had been received without the second type frame and the third type frame, is provided.

The first type frame may include a management frame. The second type frame may include a QoS data frame. The third frame may include one of a trigger frame or a frame including UL MU (uplink multi-user) response scheduling A control (aggregated control) field.

The method may further comprises: receiving a specific management frame including information on the ACK policy; and transmitting an ACK signal for the specific management frame to the second STA based on the ACK policy of the specific management frame.

The method may further comprises: receiving a MU PPDU (Multi User Protocol Data Unit) from the second STA; receiving a BAR (Block Ack Request) frame from the second STA; and transmitting a Multi-STA Block ACK frame for the MU PPDU, when a BA (Block Ack) type field of the BAR frame has a predetermined value.

Here, the BAR frame may include the BA type field followed by a Multi-STA Block Ack Request variant, when the BA type field has the predetermined value.

In another aspect of the present invention, a first STA configured to transmit an acknowledgement (ACK) signal to a second STA, the first STA comprising: a transceiver configured to receive a first type frame, not including a quality of service (QoS) control field, from the second STA; and a processor configured to control the transceiver to: transmit an ACK signal for the first type frame to the second STA based on an ACK policy of a QoS control field of a second type frame, when the first type frame had been received as aggregated with the second type frame including the QoS control field; transmit the ACK signal for the first type frame to the second STA through resources allocated by a third type frame, when the first type frame had been received with the third type frame including resource allocation information, wherein the processor determines not to transmit the ACK signal for the first type frame, when the first frame had been received without the second type frame and the third type frame, is provided.

The first type frame may include a management frame. The second type frame may include a QoS data frame. The third type frame may include one of a trigger frame or a frame including UL MU (uplink multi-user) response scheduling A control (aggregated control) field.

When the transceiver receives a specific management frame including information on the ACK policy, the processor may be configured to control the transceiver to transmit an ACK signal for the specific management frame to the second STA based on the ACK policy of the specific management frame.

When the transceiver receives a MU PPDU (Multi User Protocol Data Unit) followed by a BAR (Block Ack Request) frame from the second STA and when a BA (Block Ack) type field of the BAR frame has a predetermined value, the processor may be configured to control the transceiver to transmit a Multi-STA Block ACK frame for the MU PPDU.

The BAR frame may include the BA type field followed by a Multi-STA Block Ack Request variant, when the BA type field has the predetermined value.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 shows one exemplary format of common information field of trigger frame according to one embodiment of the present invention;

FIG. 7 shows one exemplary format of per user Info field of the trigger frame according to one embodiment of the present invention;

DETAILED DESCRIPTION OF THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the invention.

As described before, the following description is given for improved acknowledgement procedures in WLAN. For this purpose, a WLAN system to which the present invention is applied will first be described.

Figure 1:
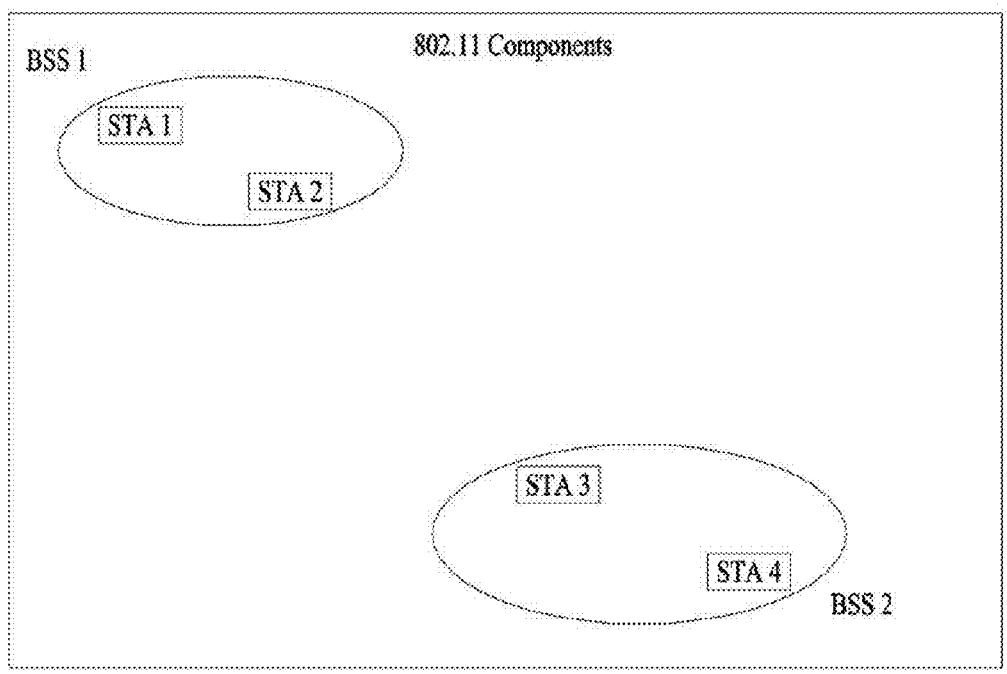
FIG. 1 is a diagram illustrating an exemplary configuration of a WLAN system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The MSS refers to a BSS that does not include an AP. Since the IBSS does not include the AP, the IBSS is not allowed to access to the DS and thus forms a self-contained network.

Figure 2:
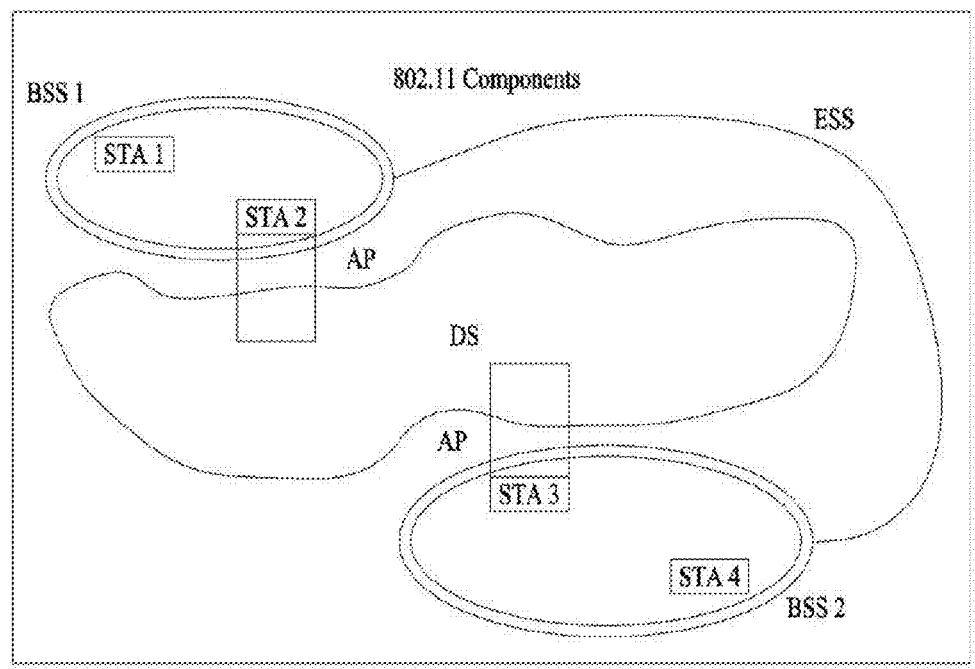
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

Figure 3:
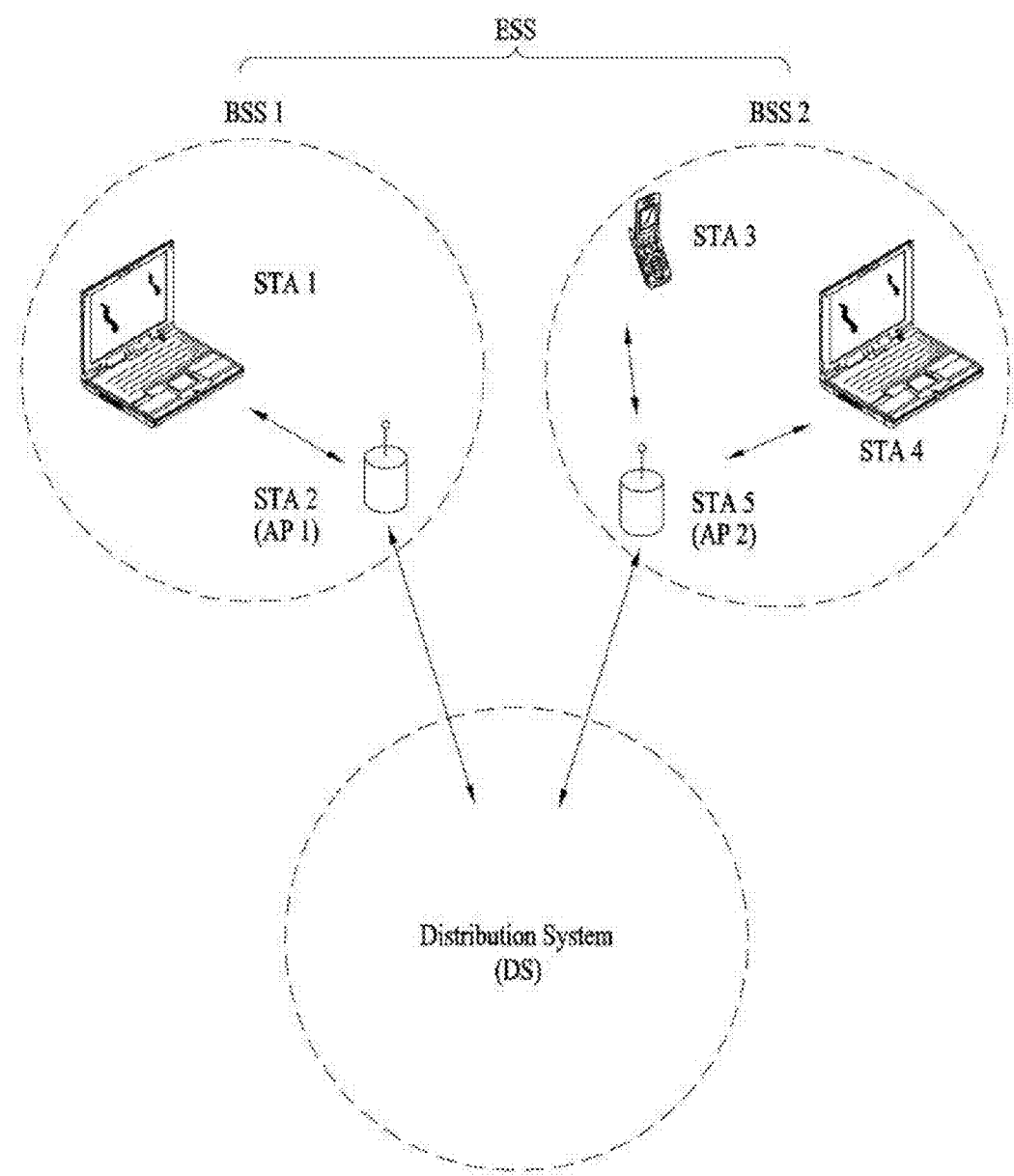
FIG. 3 illustrates an exemplary configuration of a WLAN system.

FIG. 3 illustrates an exemplary configuration of a WLAN system. In FIG. 3, an exemplary infrastructure BSS including a DS is illustrated.

In the example of FIG. 3, an ESS includes BSS1 and BSS2. In the WLAN system, an STA is a device complying with Medium Access Control/Physical (MAC/PHY) regulations of Institute of Electrical and Electronics Engineers (IEEE) 802.11. STAs are categorized into AP STAs and non-AP STAs. The non-AP STAs are devices handled directly by users, such as laptop computers and mobile phones. In FIG. 3, STA1, STA3, and STA4 are non-AP STAs, whereas STA2 and STA5 are AP STAs.

In the following description, a non-AP STA may be referred to as a terminal, a Wireless Transmit/Receive Unit (WTRU), a User Equipment (UE), a Mobile Station (MS), a Mobile Terminal (MT), or a Mobile Subscriber Station (MSS). An AP corresponds to a Base Station (BS), a Node B, an evolved Node B (eNB), a Base Transceiver System (BTS), or a femto BS in other wireless communication fields.

Various UL MU transmission schemes in HE WLAN are explained as following.

Trigger Frame Based UL MU Transmission

Figure 4:
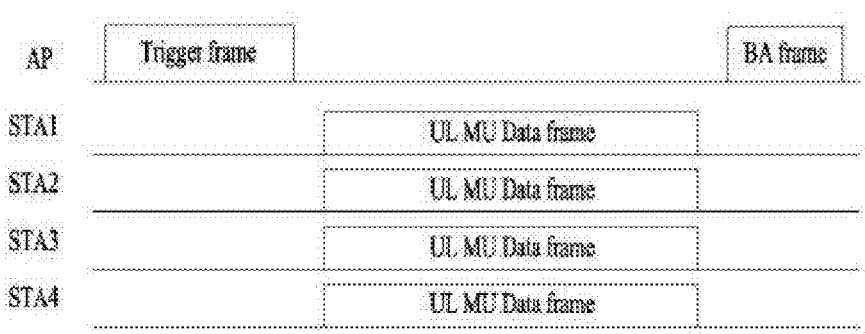
FIG. 4 is a view illustrating uplink multi-user (UL MU) transmission applicable to the present disclosure.

FIG. 4 is a view illustrating uplink multi-user (UL MU) transmission applicable to the present disclosure.

The AP may acquire a TXOP to access a medium, and transmit a signal by occupying the medium through contention. Referring to FIG. 4, the AP STA may transmit a trigger frame to a plurality of STAs to perform UL MU transmission. In this case, the trigger frame may include, for example, information about a resource allocation position and size, IDs of the STAs, MCS, and MU type (=MIMO, OFDMA) as UL MU allocation information. That is, the trigger frame transmitted by the AP STA to the plurality of STAs may be a frame allowing the plurality of STAs to perform UL data transmissions.

The plurality of STAs may transmit data to the AP after an SIFS elapses based on a format indicated by the trigger frame. The AP may then send ACK/NACK information to the STAs, and thus the STAs may perform UL MU transmissions.

As stated above, the Trigger frame is used to allocate resource for UL MU transmission and to solicit an UL MU transmission at specific time after the PPDU that carries the Trigger frame. The Trigger frame also carries other information required by the responding STA to send UL MU.

Figure 5:
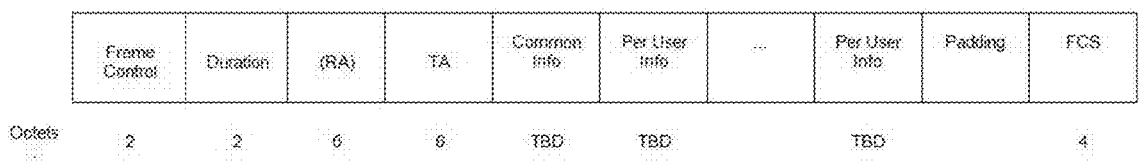
FIG. 5 shows one exemplary format of trigger frame according to one embodiment of the present invention.

FIG. 5 shows one exemplary format of trigger frame according to one embodiment of the present invention.

The Duration/ID field is set as Duration/ID field for QoS STA. The RA field of the Trigger frame is the address of the recipient STA. Whether RA is not part of Trigger frame is to be determined soon. The TA field value is the address of the STA transmitting the Trigger frame.

FIG. 6 shows one exemplary format of common information field of trigger frame according to one embodiment of the present invention.

The Length subfield of the Common Info field indicates the value of the L-SIG Length field of the HE trigger-based PPDU that is the response to the Trigger frame. If the Cascade Indication subfield is 1, then a subsequent Trigger frame follows the current Trigger frame. Otherwise the Cascade Indication subfield is 0. The CS Required subfield is set to 1 to indicate that the STAs identified in the Per User Info fields are required to use ED to sense the medium and to consider the medium state and the NAV in determining whether or not to respond. The CS Required subfield is set to 0 to indicate that the STAs identified in the Per User Info fields are not required consider the medium state or the NAV in determining whether or not to respond.

The HE-SIG-A Info subfield of the Common Info field indicates the content of the HE-SIG-A field of the HE trigger-based PPDU response. The TBD bits in HE-SIG-A of the HE trigger-based PPDU that may be implicitly known by all responding STAs can be excluded.

The CP and LTF Type subfield of the Common Info field indicates the CP and HE-LTF type of the HE trigger-based PPDU response. The CP and LTF field encoding is defined in Table 1.

TABLE 1

| CP and LTF field value | Description |
| --- | --- |
| 0 | 2× LTF + 0.8 µs CP |
| 1 | 2× LTF + 1.6 µs CP |
| 2 | 4× LTF + 3.2 µs CP |
| 3-TBD | Reserved |

The Trigger Type subfield indicates the type of the Trigger frame. The Trigger frame can include an optional type-specific Common Info and optional type-specific Per User Info. Table 2 defines the valid Trigger Type.

TABLE 2

| Trigger Type value | Trigger Type description |
| --- | --- |
| 0 | Basic Trigger |
| 1 | Beamforming Report Poll Trigger |
| 2 | MU-BAR |
| 3 | MU-RTS |
| 4-TBD | Reserved |

FIG. 7 shows one exemplary format of per user Info field of the trigger frame according to one embodiment of the present invention.

The User Identifier subfield of the Per User Info field indicates the AID of the STA allocated the RU to transmit the MPDU(s) in the HE trigger-based PPDU.

The RU Allocation subfield of the Per User Info field indicates the RU used by the HE trigger-based PPDU of the STA identified by User Identifier subfield.

The Coding Type subfield of the Per User Info field indicates the code type of the HE trigger-based PPDU response of the STA identified by User Identifier subfield. Set to 0 for BCC and set to 1 for LDPC.

The MCS subfield of the Per User Info field indicates the MCS of the HE trigger-based PPDU response of the STA identified by User Identifier field.

The DCM subfield of the Per User Info field indicates dual carrier modulation of the HE trigger-based PPDU response of the STA identified by User Identifier subfield. A value of 1 indicates that the HE trigger-based PPDU response shall use DCM. Set to 0 to indicate that DCM shall not be used.

The SS Allocation subfield of the Per User Info field indicates the spatial streams of the HE trigger-based PPDU response of the STA identified by User Identifier field. The Padding field extends the frame length to give the recipient STAs more time to prepare a response.

ACK Procedure Based on QoS Control Field

Figure 8:
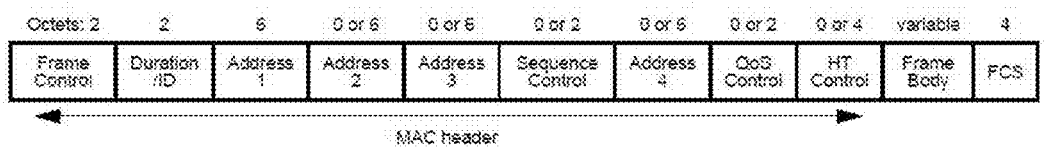
FIG. 8 shows a general MAC frame format of WLAN.

FIG. 8 shows a general MAC frame format of WLAN.

The MAC frame format comprises a set of fields that occur in a fixed order in all frames. The first three fields (Frame Control, Duration/ID, and Address 1) and the last field (FCS) in FIG. 8 constitute the minimal frame format and are present in all frames, including reserved types and subtypes. The fields Address 2, Address 3, Sequence Control, Address 4, QoS Control, HT Control, and Frame Body are present only in certain frame types and subtypes.

Among the fields present only in certain frame types and subtypes, QoS Control field including Ack policy information is explained.

The QoS Control field is a 16-bit field that identifies the TC or TS to which the frame belongs as well as various other QoS-related, A-MSDU related, and mesh-related information about the frame that varies by frame type, subtype, and type of transmitting STA. The QoS Control field is present in all Data frames in which the QoS subfield of the Subtype subfield is equal to 1.

Bits 5-6 of QoS Control field indicates Ack policy. That is, the Ack Policy subfield is 2 bits in length and identifies the acknowledgment policy that is followed upon the delivery of the MPDU. The interpretation of these 2 bits is given in following Table.

TABLE 3

Bits in QoS Control field

| Bit 5 | Bit 6 | Meaning |
|---|---|---|
| 0 | 0 | Normal Ack or Implicit Block Ack Request. In a frame that is a non-A-MPDU frame or VHT single MPDU: The addressed recipient returns an Ack or QoS + CF-Ack frame after a short interframe space (SIFS) period. A non-DMG STA sets the Ack Policy subfield for individually addressed QoS Null (no data) frames to this value. Otherwise: The addressed recipient returns a BlockAck frame, either individually or as part of an A-MPDU starting a SIFS after the PPDU carrying the frame. |
| 1 | 0 | No Ack The addressed recipient takes no action upon receipt of the frame. The Ack Policy subfield is set to this value in all individually addressed frames in which the sender does not require acknowledgment. The Ack Policy subfield is also set to this value in all group addressed frames that use the QoS frame format except with a TID for which a block ack agreement exists. This value of the Ack Policy subfield is not used for QoS Data frames with a TID for which a block ack agreement exists. The Ack Policy subfield for group addressed QoS Null (no data) frames is set to this value. |
| 0 | 1 | No explicit acknowledgment or PSMP Ack. When bit 6 of the Frame Control field is set to 1: There might be a response frame to the frame that is received, but it is neither the Ack frame nor any Data frame of subtype + CF-Ack. The Ack Policy subfield for QoS CF-Poll and QoS CF-Ack + CF-Poll Data frames is set to this value. When bit 6 of the Frame Control field is set to 0: The acknowledgment for a frame indicating PSMP Ack when it appears in a PSMP downlink transmission time (PSMP-DTT) is to be received in a later PSMP uplink transmission time (PSMP-UTT). The acknowledgment for a frame indicating PSMP Ack when it appears in a PSMPUTT is to be received in a later PSMP-DTT. NOTE-Bit 6 of the Frame Control field indicates the absence of a data Frame Body field. When equal to 1, the QoS Data frame contains no Frame Body field, and any response is generated in response to a QoS CF-Poll or QoS CF-Ack + CF-Poll frame, but does not signify an acknowledgment of data. When set to 0, the QoS Data frame contains a Frame Body field. |
| 1 | 1 | Block Ack The addressed recipient takes no action upon the receipt of the frame except for recording the state. The recipient can expect a BlockAckReq frame or implicit block ack request in the future to which it responds. |

Based on this Ack Policy, the STA, which is a recipient, in the MPDU including QoS Control field, may acknowledge the received MPDU based on the Ack policy of the QoS Control field.

ACK Procedure for a Frame without QoS Control Field

However, there are some frames not having the above explained QoS Control field. One example would be a management frame, such as MMPDU (Management MAC PDU).

Regarding the MMPDU, there is no specified acknowledgement rule defined for the recipient. Thus, one aspect of the present invention proposes acknowledgement rule for the frame without QoS Control field (hereinafter, '1$^{st}$ type frame'), such as MMPDU.

Figure 9:
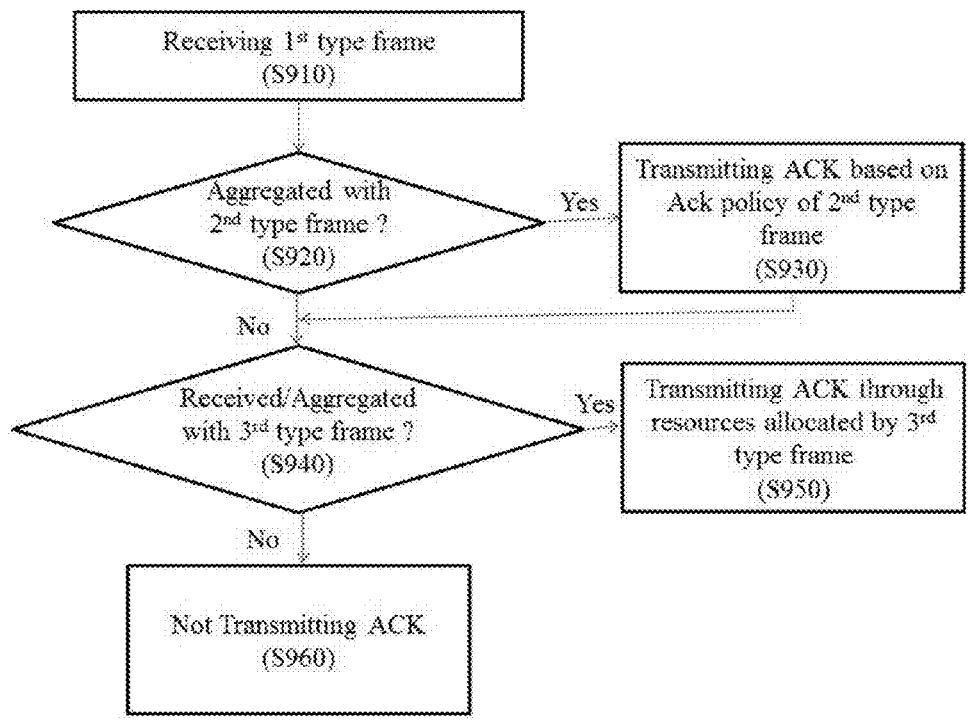
FIG. 9 shows a block diagram for defining acknowledgement rule for the 1$^{st}$ type frame according to one example of the present invention.

FIG. 9 shows a block diagram for defining acknowledgement rule for the 1$^{st}$ type frame according to one example of the present invention.

When a first STA receives a first type frame, not including a QoS control field, from a second STA (S910), the first STA of this example determines whether the first frame had been aggregated with a second type frame including the QoS Control field (S920). When the first type frame had been received as aggregated with the second type frame including the QoS control field, the first STA transmit an ACK signal for the first type frame to the second STA based on an ACK policy of the QoS control field of the second type frame (S930). Here, the first type frame can be a management frame, and the second type frame can be a QoS data frame.

That is, when the Ack policy of the QoS control field of the QoS data frame indicates 00 (implicit BAR or Normal ACK), the Ack to the management frame can be transmitted as immediate response in a SU format using implicit BAR operation. Likewise, when the Ack policy of of the QoS data frame indicates 11 (BA), the first STA would wait to receive BAR (or MU BAR) without immediate response.

However, when the Ack policy of the QoS data frame indicates 01 (MU ACK), the transmission of the ACK to the management frame depends on whether the management frame is received together with trigger frame or a frame including UL MU response scheduling A control field. If the management frame is received without trigger frame or DL MU frame including UL MU response scheduling A control field, the first STA would not transmit the Ack to the management frame. However, when the management frame is received together with the frame with MU scheduling information, the first STA would transmit the MU ACK based on this scheduling.

For this end, and regardless of the aggregation with the second type frame, the first STA also determines whether the first type frame is received together with a third type frame including UL MU scheduling information (S940). When the first type frame had been received with the third type frame including resource allocation information, the first STA would transmit the ACK signal for the first type frame to the second STA through resources allocated by a third type frame (S950).

Here, the third frame includes one of a trigger frame or a frame including UL MU (uplink multi-user) response scheduling A control (aggregated control) field, as stated above.

In this case, when the first type frame has been received together with the second type frame, the Ack policy of the second type frame might be used. However, if the first type frame has been received without the second type frame, the format of Ack would be any one of Ack, Block Ack, Multi-STA Block Ack. These format of Ack might be predetermined.

On the other hand, when the first frame had been received without the second type frame and the third type frame, the first STA would not transmit the ACK signal for the first type frame (S960).

Based on the above explained acknowledgement procedure, there would be no ambiguity for transmitting Ack to the first type frame, such as MMPDU.

As a summery, the following acknowledgement procedure is proposed.

A STA that is the recipient, within an HE MU PPDU, of an MMPDU either that is aggregated with a Trigger frame in an A-MPDU or with the UL MU response scheduling A-Control field, shall send the immediate response according to the scheduling information defined by the UL trigger information that is carried either in the Trigger frame(s) or in the MAC header (UL MU response scheduling). A STA that is the recipient, within an HE MU PPDU, of an MMPDU that is aggregated with QoS data frame(s) in an A-MPDU without UL trigger information, shall send the acknowledgement of MMPDU according to the Ack Policy of the QoS data frame(s). A STA that is the recipient, within an HE MU PPDU, of only an MMPDU without reception of any other frame, shall not send the immediate response to the HE MU PPDU.

In another example, a new management frame format including information on the ACK policy can be introduced. HE A Control field of this specific management frame may include 2 bit length Ack policy information, thus the STA receiving this specific management frame may follow the information of the Ack policy.

MU Acknowledgement Procedure

The acknowledgment procedure performed by a STA that receives MPDUs that were transmitted within a VHT MU PPDU or an HE MU PPDU for DL transmission is the same as the acknowledgement procedure for MPDUs that were not transmitted within a VHT MU PPDU or an HE MU PPDU for DL transmission. Responses to A-MPDUs within a VHT MU PPDU or an HE MU PPDU for DL transmission that are not immediate responses to the VHT MU PPDU or the HE MU PPDU for DL transmission are transmitted in response to explicit BlockAckReq frames by the AP.

Figure 10:
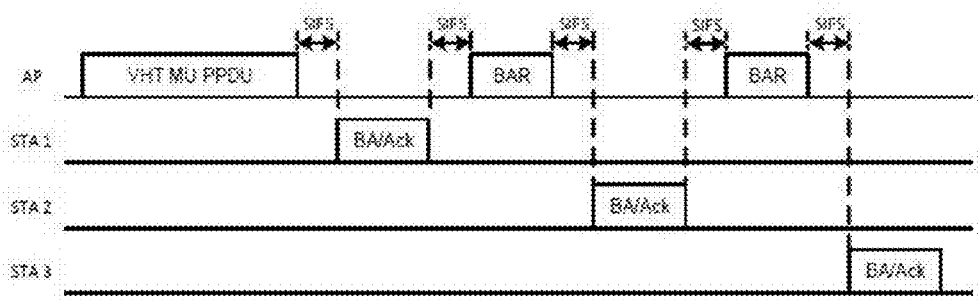
FIGS. 10-11 show examples of VHT MU PPDU frame exchange sequences.
Figure 11:
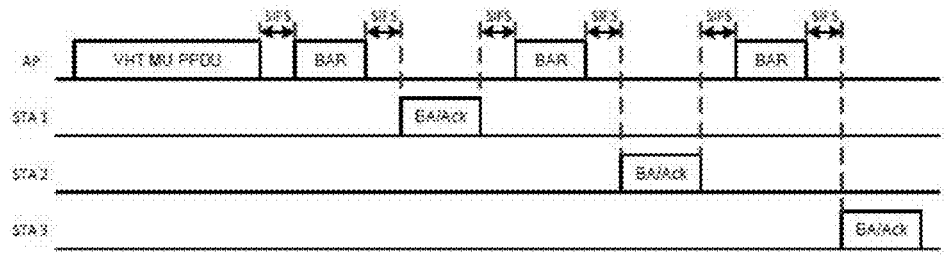

FIGS. 10-11 show examples of VHT MU PPDU frame exchange sequences.

Specifically, FIG. 10 shows an example of a TXOP containing a VHT MU PPDU transmission with an immediate acknowledgment to the VHT MU PPDU, and FIG. 11 shows an example of a TXOP containing a VHT MU PPDU transmission with no immediate acknowledgment to the VHT MU PPDU.

Recovery within the TXOP that contains a VHT MU PPDU or an HE MU PPDU for DL transmission can be performed according to the rules of 10.22.2.7 (Multiple frame transmission in an EDCA TXOP). BlockAck-Request frames related to A-MPDUs within a VHT MU PPDU or an HE MU PPDU for DL transmission can be transmitted in a TXOP separate from the one that contained the VHT MU PPDU or the HE MU PPDU for DL transmission.

Acknowledgement Procedure for an UL MU Transmission

When receiving frames from more than one STA that are part of an UL MU transmission and that require an immediate acknowledgement (i.e., the Ack Policy subfield of the eliciting QoS Data frame is equal to Normal Ack or Implicit BAR), an AP may send either multiple BlockAck frames (or Ack frames) in an HE MU PPDU, or a Multi-STA BlockAck frame. Multi-STA BlockAck frame transmissions are allowed in a non-HT Duplicate PPDU, HT PPDU, VHT PPDU, HE SU PPDU, HE ER SU PPDU and OFDMA HE MU PPDU. After a successful reception of an UL frame requiring acknowledgment, transmission of the DL acknowledgement shall commence after a SIFS, without regard to the busy/idle state of the medium. Specifically, when an AP transmits an immediate acknowledgement in HE MU PPDU in response to (A-)MPDU sent in HE TB PPDU, the AP should send it within the 20 MHz channel(s) where the pre-HE modulated fields of the HE TB PPDU sent by the STA are located. The immediate acknowledgement is either a BlockAck frame, Ack frame or Multi-STA Block Ack frame.

Figure 12:
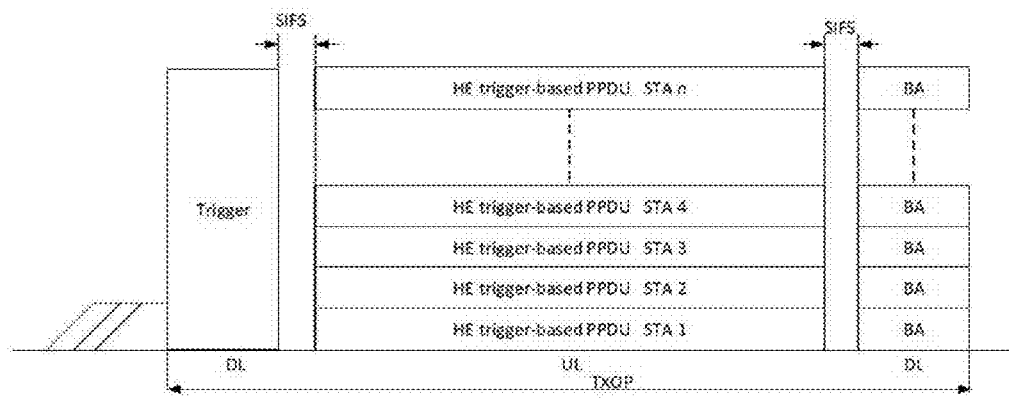
FIG. 12 shows an example of a DL OFDMA BA.

FIG. 12 shows an example of a DL OFDMA BA.

That is, FIG. 12 shows an example of an UL MU transmission with an immediate DL MU transmission containing individually addressed BlockAck frames acknowledging the frames received from the respective STAs.

Figure 13:
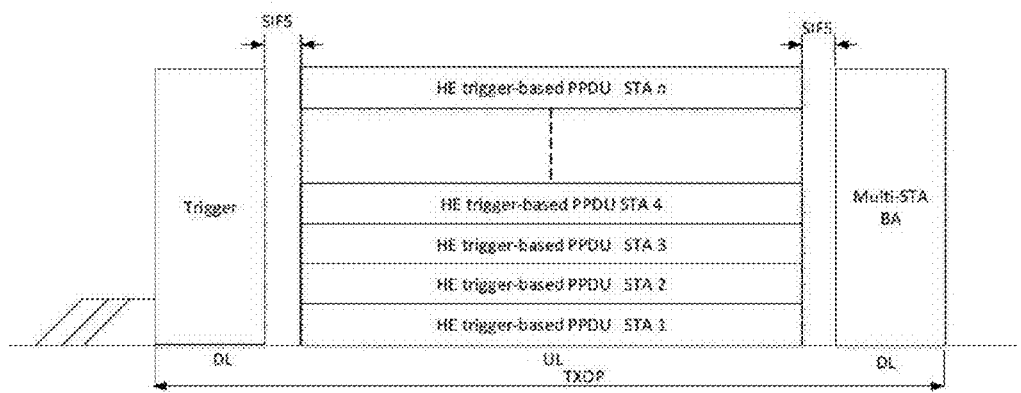
FIG. 13 shows an example of a Multi-STA BlockAck frame acknowledgement in a non-HT, HT, VHT or HE SU PPDU.

FIG. 13 shows an example of a Multi-STA BlockAck frame acknowledgement in a non-HT, HT, VHT or HE SU PPDU.

That is, FIG. 13 is an example of UL MU transmissions with an immediate Multi-STA BlockAck frame acknowledging the MPDUs.

Figure 14:
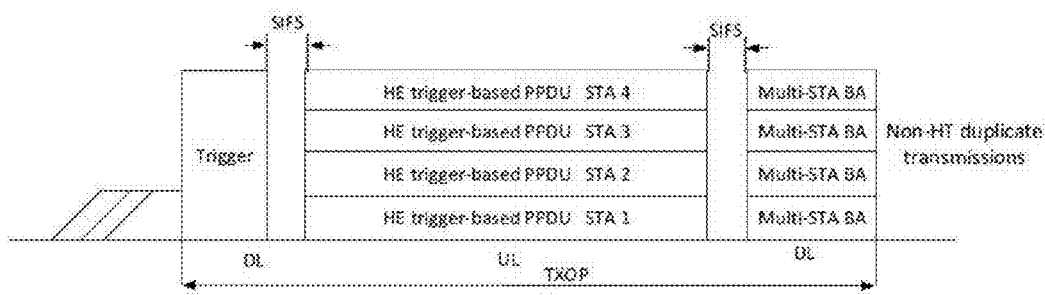
FIG. 14 shows an example of a Multi-STA BlockAck frame acknowledgement in a non-HT Duplicate PPDU.

FIG. 14 shows an example of a Multi-STA BlockAck frame acknowledgement in a non-HT Duplicate PPDU.

That is, FIG. 14 is an example of UL MU transmissions with an immediate DL non-HT duplicate PPDU containing the Multi-STA BlockAck frame.

The Ack Policy subfield of a QoS data frame sent in an HE TB PPDU shall not be set to Block Ack.

A STA may use a BlockAckReq frame to solicit the acknowledgment frame(s), to whom the STA sent the QoS Data frame(s) with Ack Policy subfield equal to Block Ack or from whom the STA did not receive the immediate acknowledgement frames after sending QoS Data frame(s) in a HE TB PPDU with Ack Policy subfield equal to Normal Ack or Implicit BAR.

As explained above, the Multi-STA blockAck frame can be used in UL MU operation, to acknowledge for UL MU frame received from multiple STAs. Also, the Multi-STA blockAck frame can be used for acknowledging to MPDUs for Multi-TID, aggregated within A-MPDU. Thus, the STA (AP or non-AP STA) can use compressed Block Ack for acknowledging A-MPDU with single TID, and use Multi-STA BlockAck frame for acknowledging Multi-TID.

When AP transmit HE MU PPDU, and request ACK/BA in SU format, the AP may request ACK/BA from the $2^{nd}$ STA by transmitting BAR (Block Ack Request). The STA receiving BAR would transmit ACK/BA based on the information of the BAR.

However, in current version of the standard, the BAR frame cannot request Multi-STA Block Ack frame. Thus, one aspect of the present invention proposes mechanism for sender STA to request Multi-STA BlockAck frame in SU format or MU format.

One example of the present invention proposes to include information to request Multi-STA BlockAck frame in BA control field of BAR frame. The following BAR information can be repeated for each of TIDs.

Figure 15:
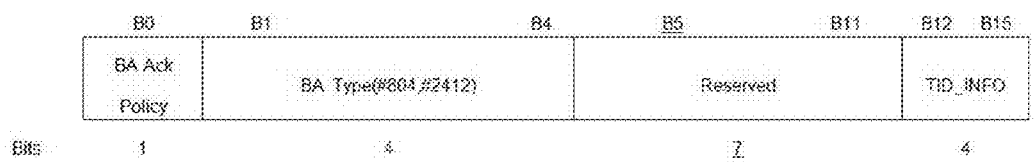
FIG. 15 shows the format of BA control field of BAR frame.

FIG. 15 shows the format of BA control field of BAR frame.

As shown in FIG. 15, the BA type subfield has a length of 4 bits. The present example proposes the following encoding of the BA type subfield.

TABLE 4

| BA Type | | | BlockAck frame variant |
|---|---|---|---|
| 0 | 0 | 00 | Basic BlockAckReq |
|   |   | 01 | Reserved |
|   |   | 10 | Reserved |
|   |   | 11 | Reserved |
| 0 | 1 | 00 | Compressed BlockAckReq |
|   |   | 01 | GLK-GCR BlockAck(#961, #1137, #212) |
|   |   | 10 | GCR BlockAck |
|   |   | 11 | Reserved |
| 1 | 0 | 00 | Extended Compressed BlockAckReq |
|   |   | 01 | Reserved |
|   |   | 10 | Reserved |
|   |   | 11 | Reserved |
| 1 | 1 | 00 | Multi-TID BlockAckReq |
|   |   | 01 | Multi-STA BlockAckReq |
|   |   | 10 | Reserved |
|   |   | 11 | Reserved |

Thus, when the BA type 1101 is indicated, Multi-STA BlockAckReq variant can be included as BAR information.

Figure 16:
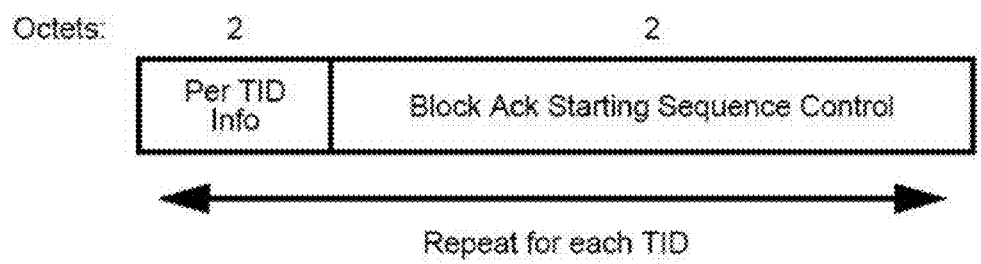
FIGS. 16 and 17 show formats of Multi-STA BlockAck-Req variant included as BAR information according to one example of the present invention.
Figure 17:
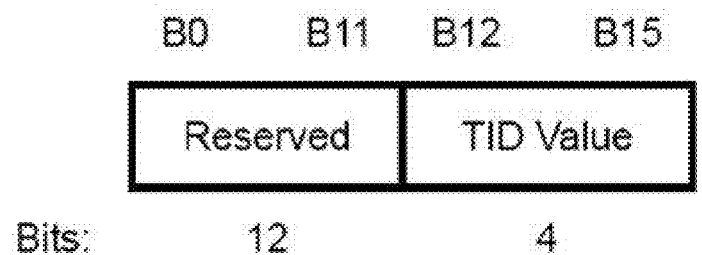

FIGS. 16 and 17 show formats of Multi-STA BlockAckReq variant included as BAR information according to one example of the present invention.

As shown in FIG. 16, the BAR information field (Multi-STA BlockAckReq) may includes PerTID information field and Block Ack Starting Sequence Control field. FIG. 17 shows an example of PerTID information field.

As stated above, perTID Info field and Block Ack Starting Sequence Control field may be repeated for each TID.

As explained above, Multi-STA BlockAck frame can be requested by BAR in SU format or MU format.

In another example of the present invention, Multi-TID BlockAckReq variant can be reused for the same purpose, instead of newly define Multi-STA BlockAckReq variable explained above.

When 11ax STA according to this example receives BAR frame (or MU-BAR frame) indicating Multi-TID BlockAckReq variable, the 11ax STA transmit Multi-STA Block Ack frame instead of Multi-TID Block Ack frame as the conventional STA does. When the 11ax STA receives BAR frame (or MU-BAR frame) whose BA type is set to Multi-TID BlockAckReq, the 11ax STA may transmit Multi-STA Block Ack frame in SU format (i.e. in non-HE PPDU format or in duplicated non-HT PPDU format) as previously defined.

When the flax STA receives BAR frame (or MU-BAR frame) whose BA type is set to Multi-TID BlockAckReq, the 11ax STA may acquire TID information and Block Ack Starting Sequence control information from the TID information, configure the Multi-STA block Ack frame, and transmit Multi-STA Block Ack through MU resource region assigned by the MU-BAR frame after SIFS from reception of MU-BAR frame.

Figure 18:
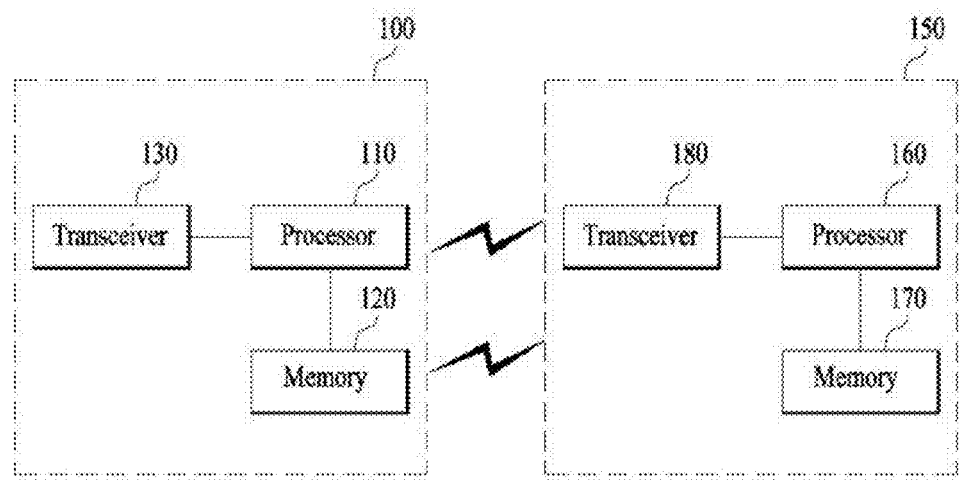
FIG. 18 is a block diagram of apparatuses for performing the above-described methods.

FIG. 18 is a block diagram of apparatuses for performing the above-described methods.

Referring to FIG. 18, a wireless apparatus 100 may be the afore-described specific STA, and a wireless apparatus 150 may be the afore-described AP.

The STA 100 may include a processor 110, a memory 120, and a transceiver 130. The AP 150 may include a processor 160, a memory 170, and a transceiver 180. The transceivers 130 and 180 may transmit and receive wireless signals and may be implemented in an IEEE 802.11/3GPP physical layer. The processors 110 and 160 may be implemented in the physical layer and/or the MAC layer and connected to the transceivers 130 and 180. The processors 110 and 160 may perform the forgoing SR operation.

The processors 110 and 160 and/or the transceivers 130 and 180 may include Application-Specific Integrated Circuit (ASICs), other chip sets, logic circuits, and/or data processors. The memories 120 and 170 may include Read Only Memories (ROMs), Random Access Memories (RAMs), flash memories, memory cards, storage media, and/or other storage units. If an embodiment is implemented in software, the above-described methods may be performed in a module (e.g., a process or a function) performing the afore-described functions. The module may be stored in the memories 120 and 160 and executed by the processors 110 and 160. The memories 120 and 170 may reside inside or outside the processors 110 and 160 and may be connected to the processors 110 and 160 by well-known means.

As is apparent from the foregoing description, control information can be efficiently transmitted in a multi-user radio frame.

While the present invention has been described above in the context of an IEEE 802.11 WLAN system, the present invention is not limited thereto. The present invention is applicable in the same manner to various wireless systems in which an AP may transmit a frame including control information for a plurality of STAs.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

What is claimed is:

1. A method for a first station (STA) to transmit an acknowledgement (ACK) signal to a second STA in a wireless local area network (WLAN), the method comprising:

receiving a first type frame, not including a quality of service (QoS) control field, from the second STA;

transmitting an ACK signal for the first type frame to the second STA based on an ACK policy of a QoS control field of a second type frame, when the first type frame had been received as aggregated with the second type frame including the QoS control field; and transmitting the ACK signal for the first type frame to the second STA through resources allocated by a third type frame, when the first type frame had been received with the third type frame including resource allocation information, wherein the first STA does not transmit the ACK signal for the first type frame, when the first frame had been received without the second type frame and the third type frame.

2. The method of claim 1, wherein the first type frame includes a management frame.

3. The method of claim 1, wherein the second type frame includes a QoS data frame.

4. The method of claim 1, wherein the third frame includes one of a trigger frame or a frame including UL MU (uplink multi-user) response scheduling A control (aggregated control) field.

5. The method of claim 1, further comprising:
receiving a specific management frame including information on the ACK policy; and
transmitting an ACK signal for the specific management frame to the second STA based on the ACK policy of the specific management frame.

6. The method of claim 1, further comprising:
receiving a MU PPDU (Multi User Protocol Data Unit) from the second STA;
receiving a BAR (Block Ack Request) frame from the second STA; and
transmitting a Multi-STA Block ACK frame for the MU PPDU, when a BA (Block Ack) type field of the BAR frame has a predetermined value.

7. The method of claim 6, wherein the BAR frame includes the BA type field followed by a Multi-STA Block Ack Request variant, when the BA type field has the predetermined value.

8. A first STA configured to transmit an acknowledgement (ACK) signal to a second STA, the first STA comprising:

a transceiver configured to receive a first type frame, not including a quality of service (QoS) control field, from the second STA; and a processor configured to control the transceiver to:
transmit an ACK signal for the first type frame to the second STA based on an ACK policy of a QoS control field of a second type frame, when the first type frame had been received as aggregated with the second type frame including the QoS control field;

transmit the ACK signal for the first type frame to the second STA through resources allocated by a third type frame, when the first type frame had been received with the third type frame including resource allocation information, wherein the processor determines not to transmit the ACK signal for the first type frame, when the first frame had been received without the second type frame and the third type frame.

9. The first STA of claim 8, wherein the first type frame includes a management frame.

10. The first STA of claim 8, wherein the second type frame includes a QoS data frame.

11. The first STA of claim 10, wherein the third type frame includes one of a trigger frame or a frame including UL MU (uplink multi-user) response scheduling A control (aggregated control) field.

12. The first STA of claim 8, wherein, when the transceiver receives a specific management frame including information on the ACK policy, the processor is configured to control the transceiver to transmit an ACK signal for the specific management frame to the second STA based on the ACK policy of the specific management frame.

13. The first type STA of claim 8, wherein, when the transceiver receives a MU PPDU (Multi User Protocol Data Unit) followed by a BAR (Block Ack Request) frame from the second STA and when a BA (Block Ack) type field of the BAR frame has a predetermined value, the processor is configured to control the transceiver to transmit a Multi-STA Block ACK frame for the MU PPDU.

14. The first type STA of claim 13, wherein the BAR frame includes the BA type field followed by a Multi-STA Block Ack Request variant, when the BA type field has the predetermined value.

* * * * *